July 31, 1928.
T. P. BOLGER
1,678,763
CHEMICAL CAN RACK FOR ICE CREAM CABINETS
Filed Aug. 17, 1927    2 Sheets-Sheet 1
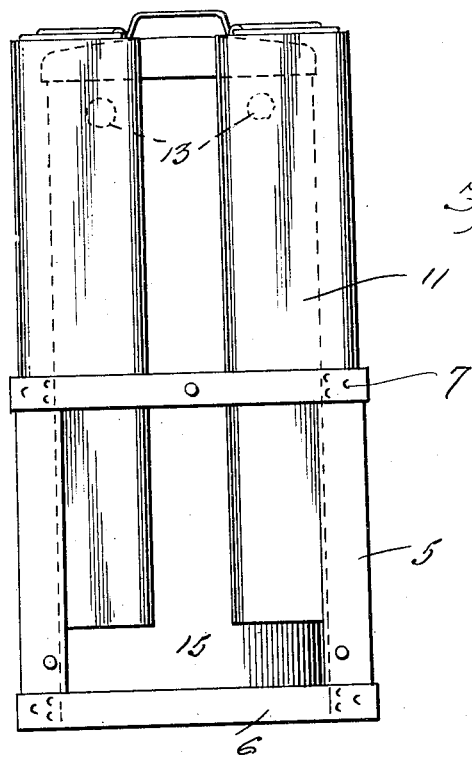
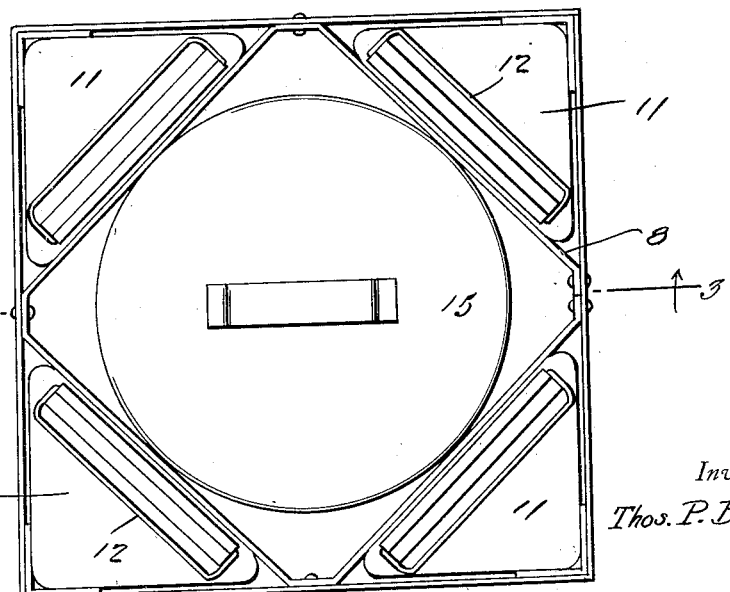
Inventor
Thos. P. Bolger
By Clarence A. O'Brien
Attorney

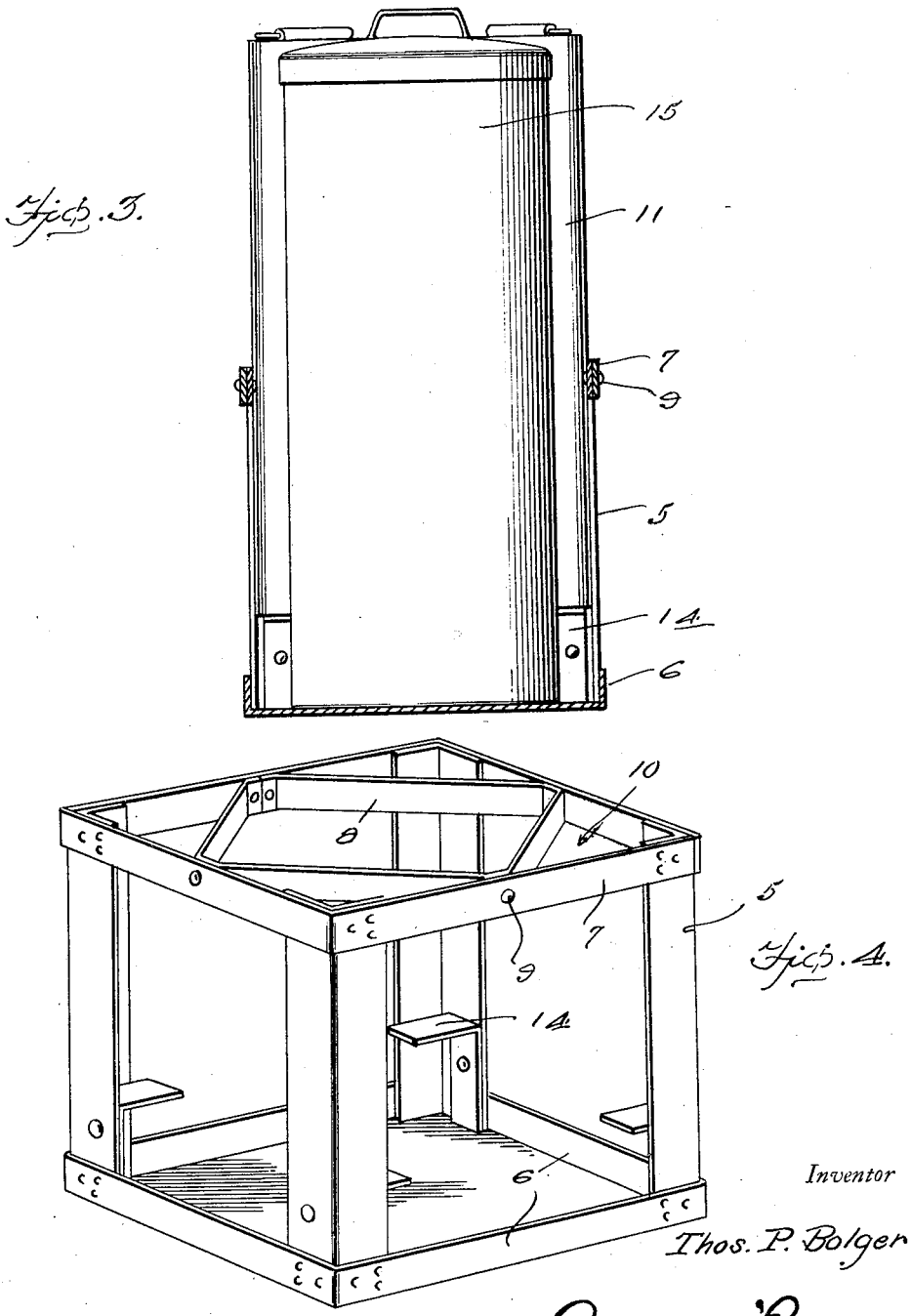

Patented July 31, 1928.

1,678,763

UNITED STATES PATENT OFFICE.

THOMAS P. BOLGER, OF GLOUCESTER, MASSACHUSETTS.

CHEMICAL CAN RACK FOR ICE-CREAM CABINETS.

Application filed August 17, 1927. Serial No. 213,569.

This invention relates to racks adapted to support a plurality of chemical freezing containers and designed to be arranged within an iceless ice cream cabinet with the ice cream can or container disposed in the center of the group of chemical cans whereby to enable the cream to be maintained at a uniform hardened state without requiring the customary ice packing which is usually necessary in preserving the cream in the average cabinet.

An object of the invention is to provide a device of this character enabling the cream of an ice cream cabinet to be maintained in a uniformly hardened state in a simple and practical manner, which improves the sanitation in the method of preserving the cream, which is inexpensive to manufacture, install and maintain, and otherwise well adapted to the purposes for which the same is intended.

Other objects and advantages reside in the special construction, combination, and arrangement of the various elements forming the invention, reference being had to the accompanying drawings forming a part hereof, wherein:—

Figure 1 is a view in side elevation showing my improved rack with the chemical can and cream container arranged in assembled position with respect thereto.

Figure 2 is a top plan view.

Figure 3 is a vertical sectional view taken along a line 3—3 of Figure 2, and,

Figure 4 is a perspective view of the rack.

Referring to the drawings in detail, the invention comprises a rack frame including vertically disposed corner posts 5, preferably formed of angle iron or the like, and connected at their lower edges by horizontal frame members 6 and at their upper edges by similar frame members 7. In the form of the invention illustrated by the present disclosure, the rack frame comprises a substantially square-shaped construction in cross section as shown in Figure 2 and is provided with an inner square shaped frame 8 having its corner sections attached by rivets 9 intermediate the ends of the upper horizontal frame members 7 whereby to form substantially triangular shaped compartments indicated at 10, at each inner corner of the rack.

Within these triangular shaped compartments complementary shaped cans 11 may be fitted, the cans being of sufficient length to extend from near the base of the rack to a substantial distance thereabove, with their upper ends provided with handles 12. An opening 13 is formed within one of the walls of each of the cans 11, near the upper end thereof, within which a suitable chemical may be poured into the can, adapted to create a freezing action.

Brackets 14 are secured to the inner angles of each of the vertical posts 5 to meet the triangular shaped compartment 10 upon which the base of the cans may rest whereby to support the same a slight distance above the lower edge of the rack.

The inner frame 8 is of a suitable area to permit an ice cream can 15 of a desired diameter to be placed within the center of the rack so as to be substantially surrounded with the chemical can 11. As shown in Figure 1 of the drawing, the upper edge of the ice cream can 15 is disposed at a substantial horizontal plane with the upper edge of the chemical cans 11 and slightly above the openings 15 of the chemical can by means of which the latter are filled.

The rack within which are assembled the chemical cans and the ice cream cans is adapted to be placed into an ice cream cabinet of the usual type provided for stores from which the ice cream is dispensed. When so arranged, the cream will be retained in a uniformly hardened state without requiring any ice packing. The rack enables the chemical cans to be held firmly around the ice cream can and at the same time, spaces the chemical can away from the inside lining of the ice cream cabniet, giving an air space thereabout. The chemical cans further extend along the ice cream container for substantially the entire distance thereof thereby keeping the cream in a uniformly hardened state throughout the extent of the can. Furthermore, the rack enables the cabinet to be maintained in a clean and sanitary condition, the rack and chemical cans being readily removed from the cabinet when desired.

It is to be understood that the rack and chemical cans may be made in suitable sizes to fit within cabinets of various dimensions.

It is obvious that the invention is susceptible of various changes in the shape, size, and combination of the various elements constituting the invention, without departing from the spirit or scope of the appended claim, and without sacrificing any of its advantages, and I accordingly claim all such forms of the device to which I am entitled.

I claim:—

A can supporting rack for ice cream cabinets comprising a substantially square shaped frame composed of a plurality of vertically disposed angle iron corner posts, a pair of strips of strap iron arranged in spaced relation about the outer edges of said corner posts, whereby to form continuously extending upper and lower horizontal frame members, an inner horizontal, substantially square shaped frame member formed of a strip of strap iron having its corners attached to the inner side of said upper horizontal frame member approximately midway of the corner posts, whereby to form substantially triangular shaped compartments between said inner and outer upper frame members and adapted to receive a triangular shaped container within each of said compartments, the area defined by the inner upper frame member being adapted to vertically support an ice cream can, and a supporting bracket carried by each of said corner posts above the lower end thereof, and extending inwardly of said compartment.

In testimony whereof I affix my signature.

THOMAS P. BOLGER.